3,625,719
PORCELAIN ENAMEL COVER COAT MILLING
Francis C. Ellinger, Warrensville Heights, Ohio, assignor to Ferro Corporation, Cleveland, Ohio
No Drawing. Continuation of application Ser. No. 668,168, Sept. 15, 1967. This application Apr. 29, 1970, Ser. No. 31,821
Int. Cl. C03c 5/02
U.S. Cl. 106—48
4 Claims

ABSTRACT OF THE DISCLOSURE

An improved acid resistant titania opacified porcelain enamel cover coat for application to metal substrates by conventional process methods, comprising, in combination, an acid resistant titania opacified frit milled for wet process application with in excess of 5% clay, said frit containing at least 10% $B_2O_3$ said enamel milled to an extremely fine particle size.

CROSS-REFERENCE TO RELATED APPLICATION

This application is a continuation of Ser. No. 668,168, filed Sept. 15, 1967, now abandoned.

BACKGROUND OF THE INVENTION

Field of invention

The field of this invention may be described generally as residing in the ceramic arts, more specifically in the art of vitrified porcelain enamels for application to metal substrates, particularly to titania opacified acid resistant vitreous enamel cover coats as are utilized, for example, in the appliance industry for various parts of washers, dryers, refrigerators, gas and electric ranges.

Some of the problems which have occurred in the prior enamels of this type are that, considering the material cost, expense of milling, preparation of the metal substrate and processing temperatures, the vitreous enamel coating is frequently bypassed by an appliance manufacturer for a particular application in favor of the cheaper, though less durable and less chemical resistant, organic coatings; too, prior efforts at economy by reducing the weight of application of a titania opacified porcelain enamel to a thickness of from 2 to 3 mils has met with failure, due to the fact that at conventional clay levels and fineness of grinding, the enamel simply lacks sufficient body or "set" to either hold an edge or, for that matter, resist running and slumping on any surface unless it is perfectly horizontal and flat.

Description of the invention

Applicant believes a review of the prior patented art will emphasize those problems heretofore encountered and further demonstrate the fact that applicant's results are totally unexpected, novel, and rather surprising, considering that applicant, contrary to previously accepted concepts has successfully utilized the combination of extremely fine grind, plus high clay, to maintain good acid resistance, workability, opacity, and continuity of coating free of black specks, to achieve a much thinner coating than heretofore possible, while utilizing a titania opacified frit containing a relatively high level of $B_2O_3$, and adapted to fire at temperatures below 1500° F.

Refer to U.S. 2,865,789 to Juvinall. It will be seen that, while Juvinall teaches an extremely fine grind for a specific purpose, he recognizes that such fineness of grind promotes a decided tendency of a porcelain enamel to tear or exhibit other undesirable characteristics during processing. See column 3, lines 64 et seq. And, while Juvinall may minimize the tearing tendencies by his application of certain, as he terms them, "anti-tearing electrolyte(s)," it is readily apparent from his disclosure that by virtue of the fact that his deposition is created by the attraction between his electrically charged particles and an oppositely charged article to be coated, he does not encounter many of the application problems encountered when enamel is applied by the conventional methods of compressed air spraying, dipping or slushing. See column 2, lines 38 et seq., wherein Juvinall makes it quite clear that his teaching has application *only* to an electrostatic spraying process without the use of compressed air.

See also column 2, lines 43 et seq. See column 2, line 51 wherein Juvinall further points out the fact that most air-sprayed enamels are milled to the conventional 2 or 3% retained on a 200 mesh screen.

Finally, notwithstanding Juvinall is capable of milling his vitreous enamel to extreme fineness for electrostatic spray application, note that he is very careful to maintain his clay level at the conventional 3½ to 4%. See column 1, line 53 and column 4, lines 30 and 31.

See U.S. 2,537,956 to Baldwin wherein it will be noted that, where acid resistance is not a factor (as with a zircon opacified enamel, well known for its total lack of acid resistance, is used as a cover cost), it is highly desirable to utilize up to 6 parts clay.

But for titania opacified acid resistant cover coats, the maximum clay that has even been used is 5%, and that was in the days of vitreous enamel cover coats which were fired at a much higher temperature than they are today. In this regard see U.S. 2,514,856 issued July 11, 1950 to Goetchius et al. who disclosed a level of 5% clay in a titania opacified cover coat.

Modern practice however, at the lower firing temperatures now employed (<1500° F.) has dictated a maximum of 4% clay in order to maintain the required acid resistance, it being well known that the higher a vitreous coating is fired, or the "harder" it is, the greater the acid resistance. For modern recommended practice, see page 57 of the latest copyrighted edition (1964) of "Porcelain Enameling Operations" by E. E. Bryant, published by the Enamelist Publishing Company, wherein a range of 1 to 4, average 2½% clay is recommended for a titania opacified acid resistant cover coat.

Finally, see U.S. 3,098,753 to Van Dolah et al.

In essence, the Van Dolah patent deals with a dark blue-black hot water tank enamel as will be readily apparent from the black metal oxide content of the frits, particularly cobalt oxide, nickel oxide and manganese oxide that Van Dolah's frits are totally free of boron, and are fired at the relatively high temperatures of 1550° F. to 1650° F.

See column 1, lines 20 et seq. of the Van Dolah et al. patent wherein it is correctly disclosed that substantial quantities of boric oxide tend to reduce acid resistance, further tending to promote excessive solubility which results in tearing, particularly if the enamel is milled finer than 5 to 10%/200 M, far more coarse than the millings of our invention.

Summarizing Van Dolah et al., he discloses that if he removes the $B_2O_3$ from a relatively hard blue-black direct on hot water tank frit (the $TiO_2$ being present in a quantity insufficient to provide any degree of opacity) that the frit can then be used in a relatively high clay, finely milled enamel for firing at approximately 1600° F.

From the prior art, it will be apparent that the softer a titania opacified frit is, particularly one that will permit a final firing in the vicinity of 1450° F., the lower the acid resistance is going to be due to the requirement for a higher level of fluxes and glass formers, such as $B_2O_3$, which in turn tend to lower the acid resistance of the frit itself. Too, heretofore, clay in excess of 4½% has always been thought to have a most deleterious effect on acid resistance.

Because tearing has always been associated with extremely finely ground cover coats and torn cover coats lack a homogeneous glassy structure, they have a tendency to be more readily attacked by acids. Thus, indirectly, titania opacified cover coats which have been extremely finely ground to the point where they exhibit tearing are considered less acid resistant.

As titania opacified frits have gotten softer with a consequential reduction in their ability to resist chemical attack, great care has been exercised heretofore to keep clay at a bare minimum, as clay in any quantity at modern processing temperatures has been expected to reduce acid resistance, and with the exception of electrostatic application for parts such as washer tops (whereon acid resistance is not nearly so critical as alkali resistance) extremely fine grinding has also been avoided as conducive to a reduction in acid resistance.

Although ground coats and zircon cover coats (non acid-resistant) have utilized relatively high clay; and whereas for hot water tank enamels wherein a frit has been formulated to be completely boron free, is adapted to be fired at relatively high temperatures, with which high clay and fine grind have been utilized, on one has dared attempt a high level of clay in a titania opacified enamel, wherein the frit contains a minimum of 10% $B_2O_3$, in combination with an extremely fine grind, to achieve a workable, improved coating at a much lesser application weight than heretofore possible but maintaining Class A acid resistance.

SUMMARY

Briefly stated, this invention resides in an acid resistant, titania opacified porcelain enamel, which will provide a minimum of Class A acid resistance when measured by the citric acid spot test, said enamel adapted to be fired at a temperature of less than 1500° F., said enamel comprising a titania opacified frit containing at least 10% $B_2O_3$, the mill addition thereof containing greater than 5, but less than 8%, preferably 6½ to 7%, clay, said mill addition milled to a fineness of 0.03 to 0.3 gram residue, per 50 cc. sample of the enamel, on a 400 mesh screen at a specific gravity of 1.74. As an aid to achieving maximum opacity in the fired cover coat, mill added $TiO_2$ in conventional amounts, preferably 5% may be utilized, although mill added $TiO_2$ is not absolutely essential to the invention.

Such an enamel surprisingly permits maintenance of high acid resistance, and outstanding processing workability at application weights considerably lower than those heretofore possible.

DESCRIPTION

In the practice of my invention, a conventional, relatively "soft" (optimum firing temperature <1500° F.) titania opacified acid resistant frit is batch weighed, mixed, smelted and quenched into flake or frit utilizing conventional batch materials and procedures, said frit having the preferred range of oxide composition as set forth below in Table I, it being understood that while this is the preferred range, any commercial titanium opacified frit having greater than 10% $B_2O_3$ can be utilized with this invention and some added benefit derived therefrom.

TABLE I.—FRIT OXIDE COMPOSITION PARTS BY WEIGHT

| | |
|---|---|
| $Li_2O$ | 0 to 2.0 |
| $Na_2O$ | 5.0 to 15.0 |
| $K_2O$ | 5.0 to 15.0 |
| $ZnO$ | 0 to 3.0 |
| $B_2O_3$ | 12.0 to 22.0 |
| $Al_2O_3$ | 0 to 2.0 |
| $SiO_2$ | 35.0 to 50.0 |
| $ZrO_2$ | 0 to 4.0 |
| $TiO_2$ | 15.0 to 25.0 |
| $P_2O_5$ | 0.5 to 4.0 |
| $As_2O_3$ | 0 to 0.25 |
| $F_2$ [1] | 2.0 to 10.0 |

[1] $F_2$ computed as replacing O in the above composition.
The foregoing components totalling 100 as they vary within the ranges indicated.

The frit of one specific preferred embodiment of this invention, designated frit X, has the following oxide composition:

TABLE II.—FRIT X PARTS BY WEIGHT

| | |
|---|---|
| $Li_2O$ | 0.30 |
| $Na_2O$ | 8.94 |
| $K_2O$ | 7.92 |
| $ZnO$ | 0.98 |
| $B_2O_3$ | 19.19 |
| $Al_2O_3$ | ---- |
| $SiO_2$ | 40.70 |
| $ZrO_2$ | ---- |
| $TiO_2$ | 19.86 |
| $P_2O_5$ | 2.10 |
| $As_2O_3$ | ---- |
| Total | 99.99 |
| $F_2$ | 5.25 |

While I have disclosed a preferred composition within a range, it is to be understood as stated above that the novelty of this invention does not lie in the frit itself other than as to its $B_2O_3$ content and general firing range, and it is contemplated that frits which are but immaterial variations of the compositional range covered in Table II may still be utilized in the practice of this invention so long as they qualify as titania opacified frits for acid resistant cover coats.

A titania opacified frit of the composition set forth in Table II was ball milled with water, according to millings A through F set forth below in Table III and the specific gravity adjusted to 1.74, with milling D representing the preferred embodiment of this invention.

TABLE III

| | Mill components in parts by weight | | | | | |
|---|---|---|---|---|---|---|
| | A | B | C | D | E | F |
| Frit X | 100 | 100 | 100 | 100 | 100 | 100 |
| Clay | 3½ | 3½ | 7 | 7 | 3½ | 7 |
| $TiO_2$ [1] | ---- | 5 | ---- | 5 | 5 | 5 |
| KCl | 3/16 | 3/16 | ---- | ---- | ---- | ---- |
| $NaNO_2$ | 3/16 | 3/16 | ---- | ---- | ---- | ---- |
| $KNO_2$ | ---- | ---- | ⅛ | ⅛ | ⅛ | ⅛ |
| Gum tragacanth | 1/32 | 1/32 | ---- | ---- | ---- | ---- |
| $NaAlO_2$ | 1/16 | 1/16 | 3/16 | 3/16 | 3/16 | 3/16 |
| Urea (after milling) | 1 | 1 | ---- | ---- | ---- | ---- |
| Fineness | (2) | (2) | (2) | (2) | (2) | (3) |

[1] Pigment grade.
[2] 0.1–0.3 gm./400M/50cc. This fineness corresponding approximately to 5 P.C. units on a Fineness of Grind Gauge as disclosed and described in U.S. Patent 2,867,789.
[3] 1–2 gm./200M/50cc.

Following milling, the enamel was applied by conventional compressed air atomization direct onto steel workpieces, which had been prepared according to well known methods to receive a titania opacified cover coat. Said workpieces for receiving said cover coat may be either conventionally ground coated, or of steel prepared by any of the well known methods to receive a titania opacified cover coat directly.

In this latter connection, we have found that another important advantage to our novel mill addition is that it materially reduces black specking, particularly in direct-on application, in which this defect is most prone to occur.

The millings of Table III were applied and fused varying firing temperatures to secure a range, and varying application thickness, all test plates examined for surface appearance, acid resistance, reflectance and color, as well as during application in the slip state, the ability of the wet enamel to hold without slumping.

Percent reflectance and color values were taken from the Gardner Color-Difference Meter Model AC–2a, Series 200, manufactured by Gardner Laboratory Inc., Bethesda 14, Md. Operation and specifications as described in Gardner Bulletin PH 261–B. Briefly, Rd indicates reflectance or "whiteness" based on an MgO standard; $a$ indicates redness-greenness, a $+a$ indicating redness, $b$ indicates yellowness-blueness, a $+b$ indicating a more yellow-white (creamy) than blue-white.

Acid resistance was measured by the well known 10% citric acid spot test.

The results of the fired enamels are charted below in Tables IV and V, application thicknesses 2.5 and 5 mils respectively:

yellowing discoloration. In addition to a yellow discoloration in the vicinity of ¾ to 1 part by weight urea, such high urea levels create aging (solubility) problems in enamel millings, causing surface defects as the urea breaks down.

Example D, compared to either Example A or B at either 2.5 or 5 mils thickness, displayed higher reflectance, yet displaying an acid resistance at least equal to milling A and B.

Example E, which is a substantial duplicate of A and B except for elimination of urea and minor variations in electrolytes, over the entire firing range, at either thickness, showed a decided tearing tendency and inferior acid resistance, at 5 mils application weight.

Furthermore, Example E at both application weights, which but for its conventional clay level, is essentially the same as mill addition D, which exemplifies this invention, displayed a marked tendency to slump and slide off the enamel plate, at 5 mils thickness the tendency to slump being so bad that the plates actually had to be sprayed in a horizontal position, which was still not enough to eliminate ultimate, aggravated tearing in the fired sheet.

Example F, compared to Example D, is essentially the same mill addition but milled to a coarser, conventional

TABLE IV

Application Thickness 2.5 Mils.[1]

| Milling from Table III | Reflectance and color at indicated firing temperature | | | | | | | | | Acid resistance, firing temperature | | |
|---|---|---|---|---|---|---|---|---|---|---|---|---|
| | 1,420° F. | | | 1,489° F. | | | 1,540° F. | | | | | |
| | Percent Rb | a | b | Percent Rd | a | b | Percent Rd | a | b | 1,420° F. | 1,480° F. | 1,540° F |
| A | 79.4 | −2.1 | −2.6 | 79.0 | −2.1 | −2.3 | 79.8 | −1.8 | −.8 | A | A | A |
| B | 81.2 | −1.8 | −2.2 | 82.6 | −1.6 | −1.1 | 82.7 | −1.6 | −.6 | A | A | A |
| C | 78.4 | −2.4 | −2.6 | 80.0 | −2.2 | −1.4 | 81.0 | −2.0 | +0.2 | A | A | A |
| D [2] | 83.8 | −1.6 | −.5 | 84.1 | −1.5 | 0.0 | 85.1 | −1.6 | +1.3 | A | A | A |
| E | 85.8 | −1.5 | −.6 | 85.2 | −.7 | −.2 | 85.2 | −1.6 | +.8 | A | A | A |
| F | 82.6 | −1.7 | −1.0 | 84.7 | −1.7 | +.1 | 84.7 | −1.3 | +1.0 | C | B | B |

[1] Exclusive of any undercoat(s).
[2] Mill addition exemplifying this invention.

TABLE V

Application Thickness 5 Mils [1]

| Milling from Table III | Reflectance and color at indicated firing temperature | | | | | | | | | Acid resistance, firing temperature | | |
|---|---|---|---|---|---|---|---|---|---|---|---|---|
| | 1,420° F. | | | 1,489° F. | | | 1,540° F. | | | | | |
| | Percent Rd | a | b | Percent Rd | a | b | Percent Rd | a | b | 1,420° F. | 1,480° F. | 1,540° F. |
| A | 83 | 1.4 | −.8 | 83.1 | −1.1 | +.3 | 82.9 | −1.1 | +1.4 | A | A | A |
| B | 86.4 | −.9 | +.5 | 86.5 | −.9 | +1.1 | 86.6 | −.7 | +2.0 | A | | A |
| C | 84.9 | −1.0 | +.7 | 85.9 | −1.4 | +1.5 | 85.6 | −1.3 | +2.8 | A | A | A |
| D [2] | 87.6 | −1.0 | +1.7 | 88.4 | −1.0 | +2.2 | 88.3 | −.9 | +3.0 | A | A | A |
| E | 88.6 | −1.0 | +1.1 | 89.5 | −1.2 | +1.8 | 88.7 | −1.1 | +2.2 | A− | A− | A− |
| F | 88.5 | −1.1 | +1.6 | 88.1 | −.9 | +1.9 | 88.5 | −.9 | +2.8 | C | C | B |

[1] Exclusive of any undercoat(s).
[2] Mill addition exemplifying this invention.

Bearing in mind that milling D represents the mill addition of this invention, the significance of the various comparative millings will be discussed.

Millings A and B are duplicates of the Juvinall mill additions of United States Patent 2,865,789 utilizing a conventional level of clay.

Contrary to all expectations, milling D with its extremely high clay and fineness of grind displayed an acid resistance equal to millings A and B containing half the amount of clay, and further displayed equal or superior surface over the entire firing range (1480° F. being the optimum firing range for a period of approximately 3½ minutes) notwithstanding, again contrary to all expectations, the extreme fineness of grind of Example D, and the complete absence of urea therein (but essential to Juvinall) in higher quantities which tends to cause a fineness. Mill addition F performs as expected heretofore, namely, that at extremely high clay levels the mill addition suffers and, because of the high clay, the surface was considerably leathery at both weights of application.

Yet, taking mill addition F to an extremely fine grind as illustrated by milling D, contrary to all expectations, the acid resistance and fired surface were greatly improved as was stability over the firing range.

Note the variation in reflectance over 120° firing range was only 1.3% Rd for milling D while milling F displayed a difference of 2.1% Rd. It must be noted also that, notwithstanding each mill contained 5% pigment grade titania, the milling D demonstrated higher reflectance over the entire range than F.

Millings A and C demonstrate that while 5% pigment grade titania is beneficial to upgrade reflectance, as would be expected, its presence is helpful, but not essential to this invention.

Applicant has thus been able, for the first time, to successfully utilize extremely fine grind combined with high clay in a titanium opacified cover coat to maintain high acid resistance contrary to expectations and further provide a cover coat adaptable to be applied more thinly than heretofore and having outstanding reflectance stability over a wide firing range, and superior slip workability for application by conventional spray, dip or slush methods.

While, under Table III above, various electrolytes, suspending and floating agents have been disclosed, it is to be understood that, as is well known in enameling technology, various electrolytes and mill agents may be incorporated, and include, but are not limited to, the following:

TABLE VI

| | Maximum in parts per 100 parts frit |
|---|---|
| Potassium carbonate | ¾ |
| Potassium chloride | ½ |
| Potassium nitrate | ¼ |
| Sodium aluminate | ⅜ |
| Potassium nitrite | ½ |
| Sodium nitrite | ½ |
| Sodium acetate | ½ |
| Sodium chlorate | ⅛ |
| Urea | ¾ |
| Zinc oxide | 2 |
| Magnesium carbonate | ½ |
| Barium carbonate | ¼ |
| Barium chloride | ¼ |
| Gum tragacanth | 1/16 |
| Bentonite | 1 |

As utilized throughout this specification and claims, the word "clay" refers to the ball clays as normally used as the major enamel suspending agent, and is exclusive of bentonite or its homologues for reasons well known to the art. At least 1/16 total parts by weight of one or more of the electrolytes of Table III or Table IV are utilized in achieving the successful enamel milling of this invention.

It is further contemplated that the dry mixed mill components of this invention constitute an article of commerce to be provided either with or without the frit dispersed therein. Thus, an enameler could be provided the dry, pre-mixed mill components of this invention minus the frit, for adding to his mill in consolidated form along with frit and water in the required amounts. Too the entire mill addition, minus water, could be premixed and dry milled and provided the enameler for final quick milling in his own mill in the nature of an "instant" enamel.

Having thus described and illustrated my invention, it is set forth in the following claims which are to be construed in the light of the United States statutes and decisions in such a manner as to give them the broad range of equivalents to which they are entitled.

I claim:

1. A wet process, acid resistant titania opacified porcelain enamel cover coat aqueous milling, said enamel milling consisting of 100 parts by weight of a titania opacified acid resistant frit containing from about 15 to about 25 weight percent $TiO_2$, and from about 12 to about 22 weight percent $B_2O_3$, said milling containing greater than 5 but less than 8 parts by weight clay, said milling having a fineness of grind of from about 0.03 to about 0.3 grams residue/400 M/50 cc. sample thereof, said milling containing, in addition to said frit and clay in the amounts stated, conventional quantities of electrolytes, suspending and floating agents, other than clay, the balance of said frit having the following oxide composition in parts by weight:

| | |
|---|---|
| $Li_2O$ | 0 to 2.0 |
| $Na_2O$ | 5.0 to 15.0 |
| $K_2O$ | 5.0 to 15.0 |
| ZnO | 0 to 3.0 |
| $Al_2O_3$ | 0 to 2.0 |
| $SiO_2$ | 35.0 to 50.0 |
| $ZrO_2$ | 0 to 4.0 |
| $P_2O_5$ | 0.5 to 4.0 |
| $As_2O_3$ | 0 to 0.25 |
| $F_2$ (computed as replacing O in the above composition) | 2.0 to 10.0 | the components of said frit totaling 100 as they vary within the ranges indicated.

2. A wet process, acid resistant titania opacified porcelain enamel cover coat aqueous milling, said enamel milling consisting of 100 parts by weight of a titania opacified acid resistant frit containing from about 15 to about 25 weight percent $TiO_2$, and from about 12 to about 22 weight percent $B_2O_3$, said milling containing greater than 5 but less than 8 parts by weight clay, said milling having a fineness of grind of from about 0.03 to about 0.3 grams residue/400 M/50 cc. sample thereof, said enamel milling containing, in addition to said frit and clay in the amounts stated, one or more mill components totaling at least 1/16 part by weight, based upon the weight of the total frit contained in said milling, selected from the class consisting of:

| | |
|---|---|
| Potassium carbonate | Urea |
| Potassium chloride | Zinc oxide |
| Potassium nitrate | Titanium oxide |
| Sodium aluminate | Magnesium carbonate |
| Potassium nitrite | Barium carbonate |
| Sodium nitrite | Barium chloride |
| Sodium acetate | Gum tragacanth |
| Sodium chlorate | Bentonite | the balance of said frit having the following oxide composition in parts by weight:

| | |
|---|---|
| $Li_2O$ | 0 to 2.0 |
| $Na_2O$ | 5.0 to 15.0 |
| $K_2O$ | 5.0 to 15.0 |
| ZnO | 0 to 3.0 |
| $Al_2O_3$ | 0 to 2.0 |
| $SiO_2$ | 35.0 to 50.0 |
| $ZrO_2$ | 0 to 4.0 |
| $P_2O_5$ | 0.5 to 4.0 |
| $As_2O_3$ | 0 to 0.25 |
| $F_2$ (computed as replacing O in the above composition) | 2.0 to 10.0 | the components of said frit totaling 100 as they vary within the ranges indicated.

3. In the method of applying a wet process, acid resistant titania opacified porcelain enamel cover coat over a ferrous metallic substrate, and subsequently fusing same thereover, the steps of:

(a) milling to an aqueous slip 100 parts by weight of a titania opacified acid resistant frit containing from about 15 to about 25 weight percent $TiO_2$ and from about 12 to about 22 weight percent $B_2O_3$, with greater than 5, but less than 8, parts by weight, based on the weight of said frit, of clay, plus conventional quantities of electrolytes, suspending and floating agents, other than clay, (b) concurrently with, and as a consequence of, step a above, milling said slip to a fineness of grind of from about 0.03 to about 0.3 grams residue/400 M/50 cc. sample thereof, (c) applying said slip, by conventional compressed air spray means, over a metallic substrate, (d) drying said slip following step c above to the point at which substantially all mechanical water has been removed, and (e) following the preceding step, fusion said slip over said substrate, at a maximum temperature of 1500° F., the balance of said frit having the following oxide composition in parts by weight:

| | |
|---|---|
| $Li_2O$ | 0 to 2.0 |
| $Na_2O$ | 5.0 to 15.0 |
| $K_2O$ | 5.0 to 15.0 |
| ZnO | 0 to 3.0 |
| $Al_2O_3$ | 0 to 2.0 |
| $SiO_2$ | 35.0 to 50.0 |
| $ZrO_2$ | 0 to 4.0 |
| $P_2O_5$ | 0.5 to 4.0 |
| $As_2O_3$ | 0 to 0.25 |
| $F_2$ (computed as replacing O in the above composition) | 2.0 to 10.0 | the components of said frit totaling 100 as they vary within the ranges indicated, to produce a fired, titania opacified porcelain enamel coating.

4. In the method of applying a wet process, acid resistant titania opacified porcelain enamel cover coat over a ferrous metallic substrate, and subsequently fusing same thereover, the steps of:

(a) milling to an aqueous slip 100 parts by weight of a titania opacified acid resistant frit, said frit containing from about 15 to about 25 weight percent $TiO_2$ and from about 12 to about 22 weight percent $B_2O_3$, with greater than 5, but less than 8, parts by weight, based on the weight of said frit, of clay, said enamel milling containing, in addition to said frit and clay in the amounts stated, one or more mill components totally at least 1/16 part by weight, based upon the weight of the total frit contained in said milling, selected from the class consisting of:

| | |
|---|---|
| Potassium carbonate | Urea |
| Potassium chloride | Zinc oxide |
| Potassium nitrate | Titanium oxide |
| Sodium aluminate | Magnesium carbonate |
| Potassium nitrite | Barium carbonate |
| Sodium nitrite | Barium chloride |
| Sodium acetate | Gum tragacanth |
| Sodium chlorate | Bentonite |

(b) concurrently with, and as a consequence of, step a above, milling said slip to a fineness of grind of from about 0.03 to about 0.3 grams residue/400 M/50 cc. sample thereof, (c) applying said slip, by conventional compressed air spray means over a metallic substrate, (d) drying said slip following step c above to the point at which substantially all mechanical water has been removed, and, (e) following the preceding step, fusing said slip over said substrate, at a maximum temperature of 1500° F., the balance of said frit having the following oxide composition in parts by weight:

| | |
|---|---|
| $Li_2O$ | 0 to 2.0 |
| $Na_2O$ | 5.0 to 15.0 |
| $K_2O$ | 5.0 to 15.0 |
| ZnO | 0 to 3.0 |
| $Al_2O_3$ | 0 to 2.0 |
| $SiO_2$ | 35.0 to 50.0 |
| $ZrO_2$ | 0 to 4.0 |
| $P_2O_5$ | 0.5 to 4.0 |
| $As_2O_3$ | 0 to 0.25 |
| $F_2$ (computed as replacing O in the above composition) | 2.0 to 10.0 | the components of said frit totaling 100 as they vary within the ranges indicated, to produce a fired, titania opacified porcelain enamel coating.

References Cited

UNITED STATES PATENTS

| | | | |
|---|---|---|---|
| 1,948,461 | 2/1934 | Kreidl | 106—48 X |
| 2,865,789 | 12/1958 | Juvinall | 106—48 X |
| 2,890,964 | 6/1959 | Commons et al. | 106—48 |
| 2,961,337 | 11/1960 | Bryant et al. | 117—70 |
| 2,975,072 | 3/1961 | Bryant et al. | 117—70 |
| 3,298,860 | 1/1967 | Bryant et al. | 117—129 |
| 3,383,225 | 5/1968 | Stradley | 106—48 |
| 3,399,078 | 8/1968 | Bang | 117—129 |
| 2,370,695 | 3/1945 | Stufft | 106—48 |

OTHER REFERENCES

Kingery, W. D.: Introduction to Ceramics, New York, 1960, pp. 437–439.

TOBIAS E. LEVOW, Primary Examiner

W. R. SATTERFIELD, Assistant Examiner

U.S. Cl. X.R.

117—129